(12) United States Patent
Wilson et al.

(10) Patent No.: US 11,580,048 B1
(45) Date of Patent: Feb. 14, 2023

(54) REFERENCE VOLTAGE TRAINING SCHEME

(71) Applicant: Cadence Design Systems, Inc., San Jose, CA (US)

(72) Inventors: Thomas E. Wilson, Laurel, MD (US); Scott Huss, Cary, NC (US); Hari Anand Ravi, Bengaluru (IN); Sachin Ramesh Gugwad, Bengaluru (IN); Balbeer Singh Rathor, Morena (IN)

(73) Assignee: Cadence Designs Systems, Inc.

( * ) Notice: Subject to any disclaimer, the term of this patent is extended or adjusted under 35 U.S.C. 154(b) by 916 days.

(21) Appl. No.: 16/356,939

(22) Filed: Mar. 18, 2019

(51) Int. Cl.
*G06F 9/30* (2018.01)
*G06F 13/42* (2006.01)
*G06F 1/12* (2006.01)

(52) U.S. Cl.
CPC ............ *G06F 13/4217* (2013.01); *G06F 1/12* (2013.01); *G06F 9/3004* (2013.01)

(58) Field of Classification Search
None
See application file for complete search history.

(56) References Cited

U.S. PATENT DOCUMENTS

| | | | |
|---|---|---|---|
| 6,768,361 B2 | 7/2004 | Kwak et al. | |
| 6,968,026 B1 | 11/2005 | Li et al. | |
| 7,916,821 B2 | 3/2011 | Li et al. | |
| 8,045,664 B2 * | 10/2011 | Ozawa | H04L 7/033 375/355 |
| 8,249,207 B1 * | 8/2012 | Hissen | H03L 7/091 375/355 |
| 9,123,408 B2 | 9/2015 | Jose et al. | |
| 9,942,028 B1 * | 4/2018 | Dickson | H03M 9/00 |
| 10,367,634 B1 * | 7/2019 | Yu | H03L 7/091 |
| 2003/0193423 A1 * | 10/2003 | Ng | H04L 25/063 341/68 |
| 2010/0220828 A1 * | 9/2010 | Fuller | H04L 25/063 375/355 |
| 2013/0346721 A1 * | 12/2013 | Giovannini | G11C 29/028 711/167 |
| 2014/0140385 A1 * | 5/2014 | Ye | H04L 25/03885 375/230 |
| 2015/0249477 A1 * | 9/2015 | Nedovic | H03L 7/0807 375/346 |
| 2019/0334693 A1 * | 10/2019 | Liu | H04L 7/0331 |

* cited by examiner

*Primary Examiner* — Danny Chan
(74) *Attorney, Agent, or Firm* — Vista IP Law Group, LLP

(57) ABSTRACT

Various aspects of the subject technology relate to systems, methods, and machine-readable media for DDR reference voltage training. The method includes receiving a data stream, the data stream including pulses generated from a reference voltage in relation to a voltage input logic low and a voltage input logic high of an input stream. The method also includes receiving a clock signal, the clock signal including an in-phase signal and a quadrature-phase signal, the in-phase signal orthogonal to the quadrature-phase signal. The method also includes utilizing the in-phase signal and the quadrature-phase signal of the clock signal in relation to the data stream to obtain a stream of in-phase samples and a stream of quadrature-phase samples. The method also includes adjusting the reference voltage based on a relationship of the stream of in-phase samples to the stream of quadrature-phase samples.

20 Claims, 10 Drawing Sheets

300 ⇘

| "$I_n$" | "$Q_n$" | "$I_{n+1}$" | VREF Update | CK Recovery Update |
|---|---|---|---|---|
| 0 | 0 | 0 | No Change | No Change |
| 0 | 0 | 1 | Decrease VREF | Increase CK Phase |
| 0 | 1 | 0 | No Change | No Change |
| 0 | 1 | 1 | Increase VREF | Decrease CK Phase |
| 1 | 0 | 0 | Decrease VREF | Decrease CK Phase |
| 1 | 0 | 1 | No Change | No Change |
| 1 | 1 | 0 | Increase VREF | Increase CK Phase |
| 1 | 1 | 1 | No Change | No Change |

| "$I_n$" | "$Q_n$" | "$I_{n+1}$" | VREF Update | CK Recovery Update |
|---|---|---|---|---|
| 0 | 0 | 0 | Decrease VREF | No Change |
| 0 | 0 | 1 | Decrease VREF | Increase CK Phase |
| 0 | 1 | 0 | No Change | No Change |
| 0 | 1 | 1 | Increase VREF | Decrease CK Phase |
| 1 | 0 | 0 | Decrease VRED | Decrease CK Phase |
| 1 | 0 | 1 | No Change | No Change |
| 1 | 1 | 0 | Increase VREF | Increase CK Phase |
| 1 | 1 | 1 | Increase VREF | No Change |

FIG. 3B

REFERENCE VOLTAGE TRAINING SCHEME

TECHNICAL FIELD

The present disclosure generally relates to reference voltage training (VREF), and more particularly to a reference voltage training scheme for double data rate (DDR) interfaces.

BACKGROUND

Conventional VREF training schemes, such as for single-ended DDR interfaces, are performed through an eye-scan, where at initialization, a brute-force READ PASS/FAIL plot is obtained by sweeping the VREF value and a strobe (DQS) signal position. The values of VREF and DQS delay, which provide maximum eye opening (e.g., eye width/height), are then chosen. At high data rates, system voltage temperature (VT) drift may lead to significant timing and voltage noise margin loss if the VREF value and DQS delay are not trained again. This results in a need to perform VREF training either periodically or continuously (e.g., during a maintenance mode). However, VREF training in maintenance mode is challenging in existing schemes, as READ operations need to be paused to perform another eye-scan. Therefore, it is desirable to perform VREF training during maintenance mode without having to halt operations.

SUMMARY

The subject disclosure provides for a VREF training scheme for DDR interfaces, such as GDDR6. The disclosed training scheme may be performed at initialization or during a maintenance mode while remaining in operation. The training scheme includes a clock recovery loop to position the clock at an optimal sampling point. The training scheme minimizes timing loss and improves voltage noise margin for DDR interface, including GDDR6.

According to one embodiment of the present disclosure, a computer-implemented method for DDR reference voltage training is provided. The method includes receiving a data stream, the data stream including pulses generated from a reference voltage in relation to a voltage input logic low and a voltage input logic high of an input stream. The method also includes receiving a clock signal, the clock signal including an in-phase signal and a quadrature-phase signal, the in-phase signal orthogonal to the quadrature-phase signal. The method also includes utilizing the in-phase signal and the quadrature-phase signal of the clock signal in relation to the data stream to obtain a stream of in-phase samples and a stream of quadrature-phase samples. The method also includes adjusting the reference voltage based on a relationship of the stream of in-phase samples to the stream of quadrature-phase samples.

According to one embodiment of the present disclosure, a system is provided including a processor and a memory comprising instructions stored thereon, which when executed by the processor, cause the processor to perform a method for DDR reference voltage training. The method includes receiving a data stream, the data stream including pulses generated from a reference voltage in relation to a voltage input logic low and a voltage input logic high of an input stream. The method also includes receiving a clock signal, the clock signal including an in-phase signal and a quadrature-phase signal, the in-phase signal orthogonal to the quadrature-phase signal. The method also includes utilizing the in-phase signal and the quadrature-phase signal of the clock signal in relation to the data stream to obtain a stream of in-phase samples and a stream of quadrature-phase samples. The method also includes adjusting the reference voltage based on a relationship of the stream of in-phase samples to the stream of quadrature-phase samples.

According to one embodiment of the present disclosure, a non-transitory computer-readable storage medium is provided including instructions (e.g., stored sequences of instructions) that, when executed by a processor, cause the processor to perform a method for DDR reference voltage training. The method includes receiving a data stream, the data stream including pulses generated from a reference voltage in relation to a voltage input logic low and a voltage input logic high of an input stream. The method also includes receiving a clock signal, the clock signal including an in-phase signal and a quadrature-phase signal, the in-phase signal orthogonal to the quadrature-phase signal. The method also includes utilizing the in-phase signal and the quadrature-phase signal of the clock signal in relation to the data stream to obtain a stream of in-phase samples and a stream of quadrature-phase samples. The method also includes adjusting the reference voltage based on a relationship of the stream of in-phase samples to the stream of quadrature-phase samples.

According to one embodiment of the present disclosure, a system is provided that includes means for storing instructions, and means for executing the stored instructions that, when executed by the means, cause the means to perform a method. The method includes receiving a data stream, the data stream including pulses generated from a reference voltage in relation to a voltage input logic low and a voltage input logic high of an input stream. The method also includes receiving a clock signal, the clock signal including an in-phase signal and a quadrature-phase signal, the in-phase signal orthogonal to the quadrature-phase signal. The method also includes utilizing the in-phase signal and the quadrature-phase signal of the clock signal in relation to the data stream to obtain a stream of in-phase samples and a stream of quadrature-phase samples. The method also includes adjusting the reference voltage based on a relationship of the stream of in-phase samples to the stream of quadrature-phase samples.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 3A and 3B illustrate logic tables for training VREF during maintenance mode and initialization, according to certain aspects of the disclosure.

Figure 1A:
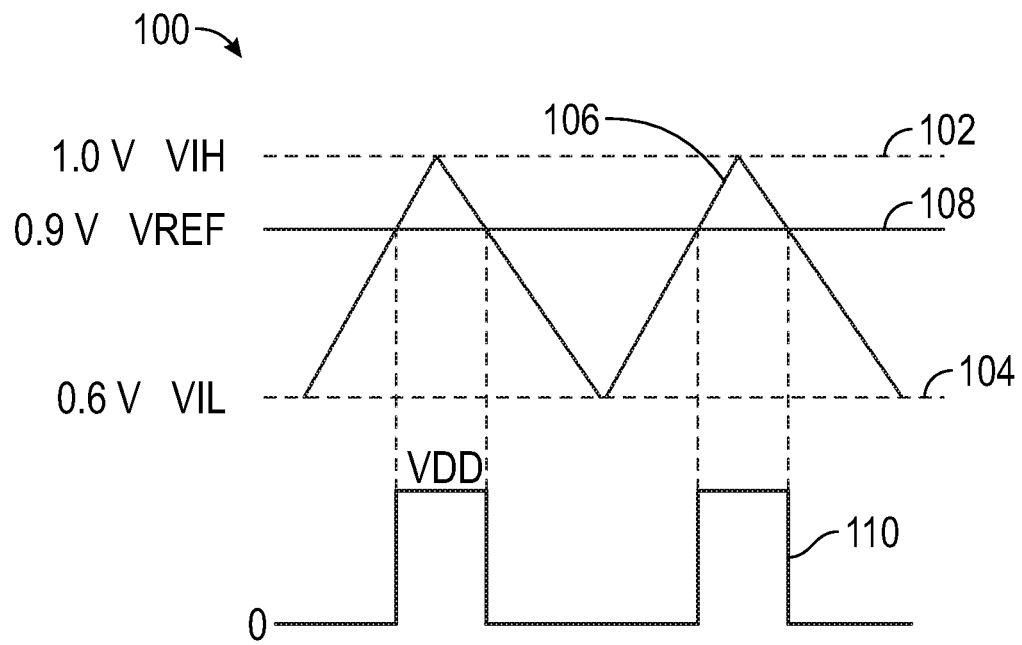
FIGS. 1A and 1B illustrate example data streams generated by a reference voltage (VREF) in relation to a voltage input logic low (VIL) and a voltage input logic high (VIH) of an input stream, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Aspects of the present disclosure address VREF training issues by providing for a scheme that minimizes timing loss and improves voltage noise margin, such as for GDDR6 interfaces. In an implementation, the training scheme employs a clock recovery loop to position the clock at an optimal data sampling point. In-phase (I) data samples and quadrature-phase (Q) transition samples, which are utilized to perform clock recovery, are utilized to perform VREF training as well. Based on the I and Q samples, the VREF value is either decreased or increased until an optimal value of VREF is achieved.

According to an aspect, VREF training may include a maintenance mode and an initialization mode. In maintenance mode, an optimal VREF is trained in the background to account for system VT drift. For example, the training may be performed on live data. In initialization mode, VREF may be either lower than VIL or higher than VIH of the incoming data stream (e.g., data logic high and low levels may not cross VREF). As a result, training may be performed with a test data pattern. Actual data transmission starts only after clock recovery and VREF training is complete.

According to an aspect, clock recovery and VREF training may be run either alternatively or simultaneously. When run simultaneously, VREF training may be a slower loop to avoid conflict between the two loops. For example, both timing margin (e.g., clock position with respect to data) and voltage margin (e.g., VREF value) may be optimized together.

The disclosed training scheme works well even in the presence of system inter-symbol interference (ISI). Additionally, per bit VREF and clock recovery training optimize the VREF value and clock position for each bit. It is understood that the disclosed reference voltage training scheme may be implemented in high speed single-ended DDR interfaces, such as where timing and voltage margins are critical (e.g., GDDR6 and others).

The disclosed system addresses a problem in traditional reference voltage training schemes tied to computer technology, namely, the technical problem of performing clock recovery and VREF training. The disclosed system solves this technical problem by providing a solution also rooted in computer technology, namely, by providing for VREF training and clock recovery through a maintenance mode and an initialization mode. This allows for VREF training and clock recovery during operation and during system initialization.

The disclosed subject technology further provides improvements to the functioning of the computer itself because it minimizes timing loss and improves voltage noise margin.

FIG. 1A illustrates an example signal diagram 100 for a maintenance mode. According to certain aspects of the disclosure, a data stream 110 may be generated by a reference voltage (VREF) 108 in relation to a voltage input logic low (VIL) 104 and a voltage input logic high (VIH) 102 of an input stream 106. For example, when VREF 108 is higher than a common mode of the signal (e.g., input stream 106), logic high levels (e.g., logic "1") are of shorter pulse width than logic low levels (e.g., logic "0"). As a result, lowering VREF 108 would result in a wider pulse, and increasing VREF 108 would result in a narrower pulse. It is understood that although a triangular wave is shown, the input stream 106 may be random in nature.

Figure 1B:
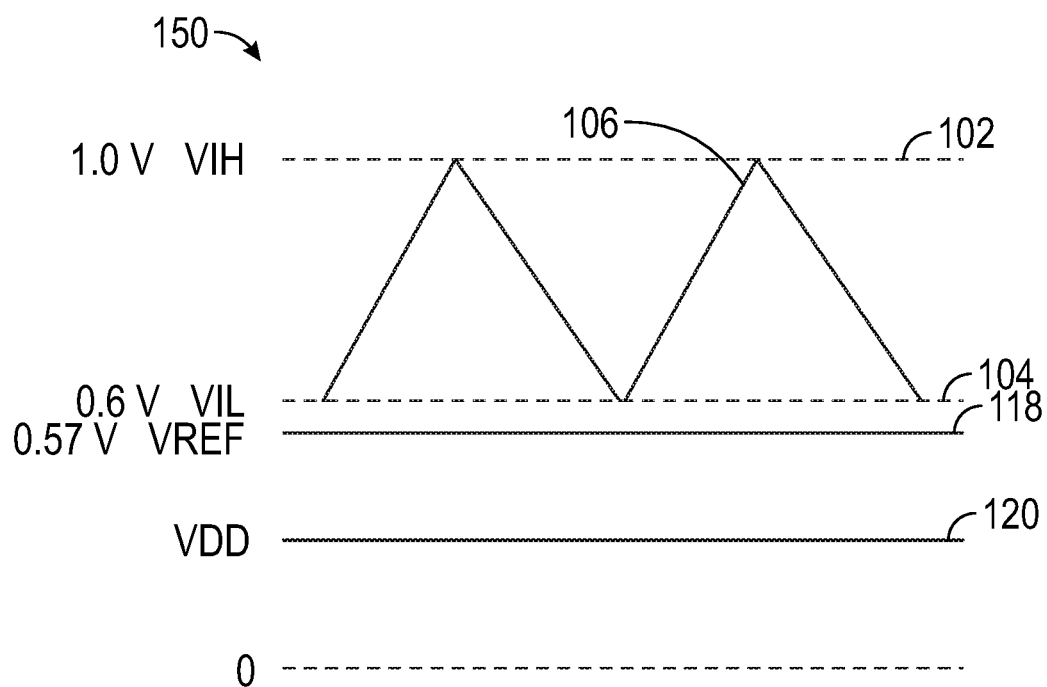

FIG. 1B illustrates an example signal diagram 150 for an initialization mode. According to certain aspects of the disclosure, a data stream 120 may be generated by a reference voltage (VREF) 118 in relation to a voltage input logic low (VIL) 104 and a voltage input logic high (VIH) 102 of an input stream 106. For example, at initialization, VREF 118 may start out either higher than VIH 102 or lower than VIL 104. When VREF 118 is lower than VIL 104, the data stream 120 is constantly at logic high levels (e.g., logic "1"). When VREF 118 is higher than VIH 102, the data stream 120 is constantly at logic low levels (e.g., logic "0"). Once VREF 118 is adjusted to be between VIH 102 and VIL 104, the data stream 120 behaves similarly to the data stream 110 of FIG. 1A.

Figure 2A:
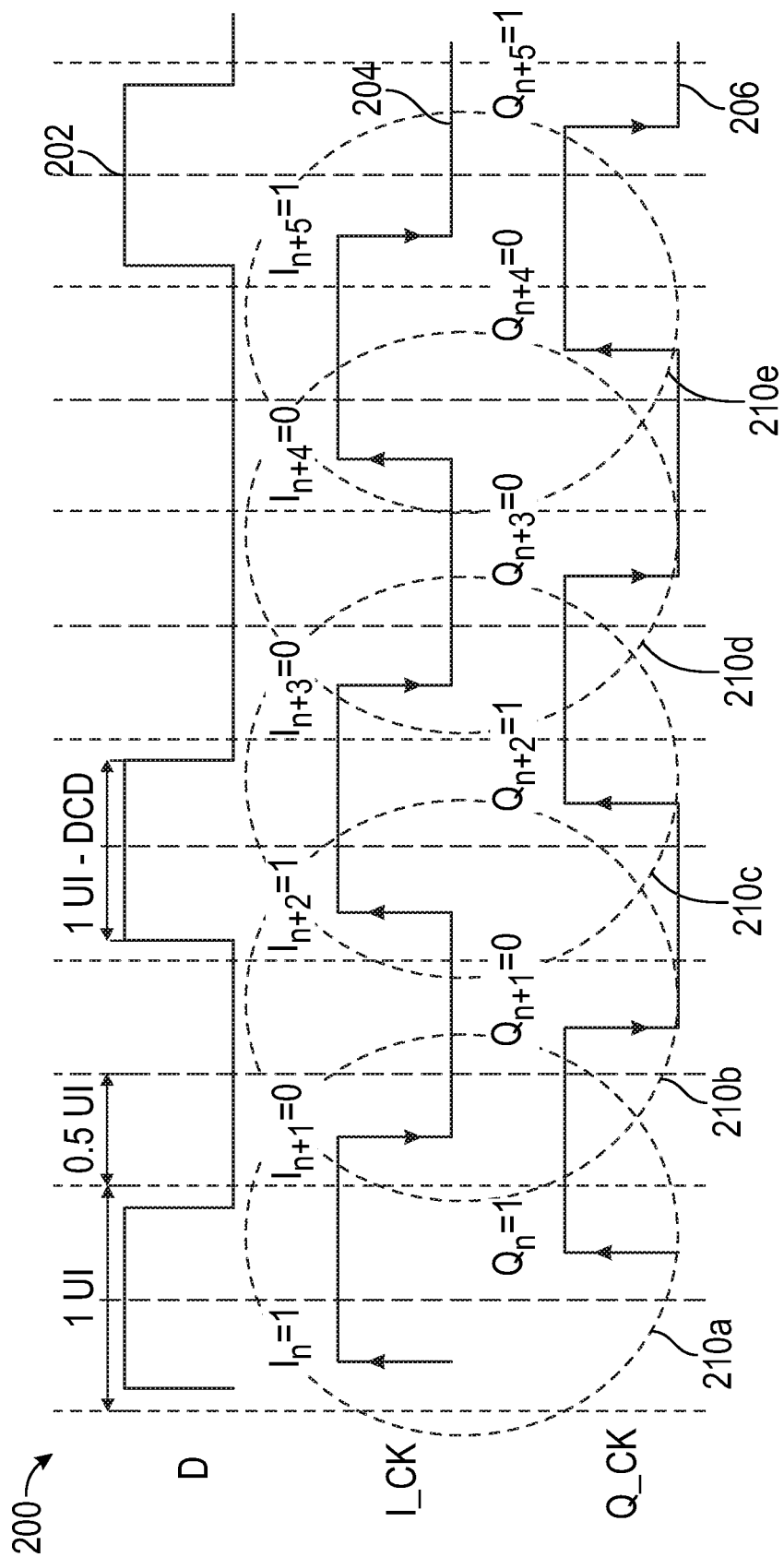
FIGS. 2A-2F illustrate example VREF training schemes, according to certain aspects of the disclosure.

FIGS. 2A-2D illustrate signal diagrams 200 corresponding to an example VREF training scheme, according to certain aspects of the disclosure. Referring to FIG. 2A, the signal diagram 200 may be for a case where the clock is early and VREF is higher than desired. For example, data stream 202 may be generated by VREF 108 as described in FIG. 1A. As illustrated, the data stream 202 may include pulses that have a width equal to a difference between 1 unit interval (UI) and a duty cycle distortion (DCD).

The clock signal may include an in-phase (I) signal 204 and a quadrature-phase (Q) signal 206. The I signal 204 and the Q signal 206 may be orthogonal to each other. The clock signals (e.g., I signal 204 and Q signal 206) may each have a width equal to 1 UI. As illustrated, the I signal 204 and the Q signal 206 are both earlier than an ideal sampling point (e.g., each early by approximately 0.25 UI).

According to an aspect, the VREF 108 may be assumed to be different from a common mode value of the input stream 106 (e.g., analog PAD signal). This results in duty cycle distortion (DCD) at a receiver output (e.g., data stream 202). In an implementation, a clock recovery loop runs first and updates the phase of the clock (e.g., I signal 204), which is controlled by a Phase Interpolator (PI) block.

In order to perform clock recovery, samples of the I signal 204 and the Q signal 206 are taken at n and n+1. For example, the I signal 204 is sampled at $I_n$ and $I_{n+1}$, and the Q signal 206 is sampled at $Q_n$. With reference to FIG. 3A, which illustrates a maintenance mode logic table 300, the clock phase is either increased, decreased, or not changed based on the logic table 300. For example, a first triplet 210a may be sampled, which includes $I_n$, $I_{n+1}$, and $Q_n$. As illustrated in FIG. 2A, $I_n=1$, $Q_n=1$, and $I_{n+1}=0$. As shown in logic table 300 of FIG. 3A, $I_n=1$, $Q_n=1$, and $I_{n+1}=0$ leads to an increase in the clock phase. Similarly, triplets 210b, 210c, 210d, and 210e are also sampled, and the clock phase is either increased, decreased, or not changed based on the logic table 300 of FIG. 3A.

In an implementation, an average of the triplets 210a-210e is taken to determine whether to increase, decrease, or not change the clock phase. For example, a second triplet 210b shows that $I_{n+1}=0$, $I_{n+1}=0$, and $I_{n+2}=1$, a third triplet 210c shows that $I_{n+2}=1$, $Q_{n+2}=1$, and $I_{n+3}=0$, and a fifth triplet 210e shows that $I_{n+4}=0$, $I_{n+4}=0$, and $I_{n+5}=1$, which indicate that the clock phase should be increased. However, a fourth triplet 210d shows that $I_{n+3}=0$, $Q_{n+3}=0$, and $I_{n+4}=0$, which indicates that the clock phase should not be changed. In this scenario, because the average of the triplets 210a-210e indicates that the clock phase should be increased, the clock phase is accordingly increased. According to an aspect, the process of updating the clock phase may be continued until the position shown in FIG. 2B, where I_CK position is locked at 0.5UI-0.5*DCD. For example, at this position, there are equal numbers of phase increase and phase decrease outcomes, and so the phase is not changed and is considered locked.

Figure 2B:
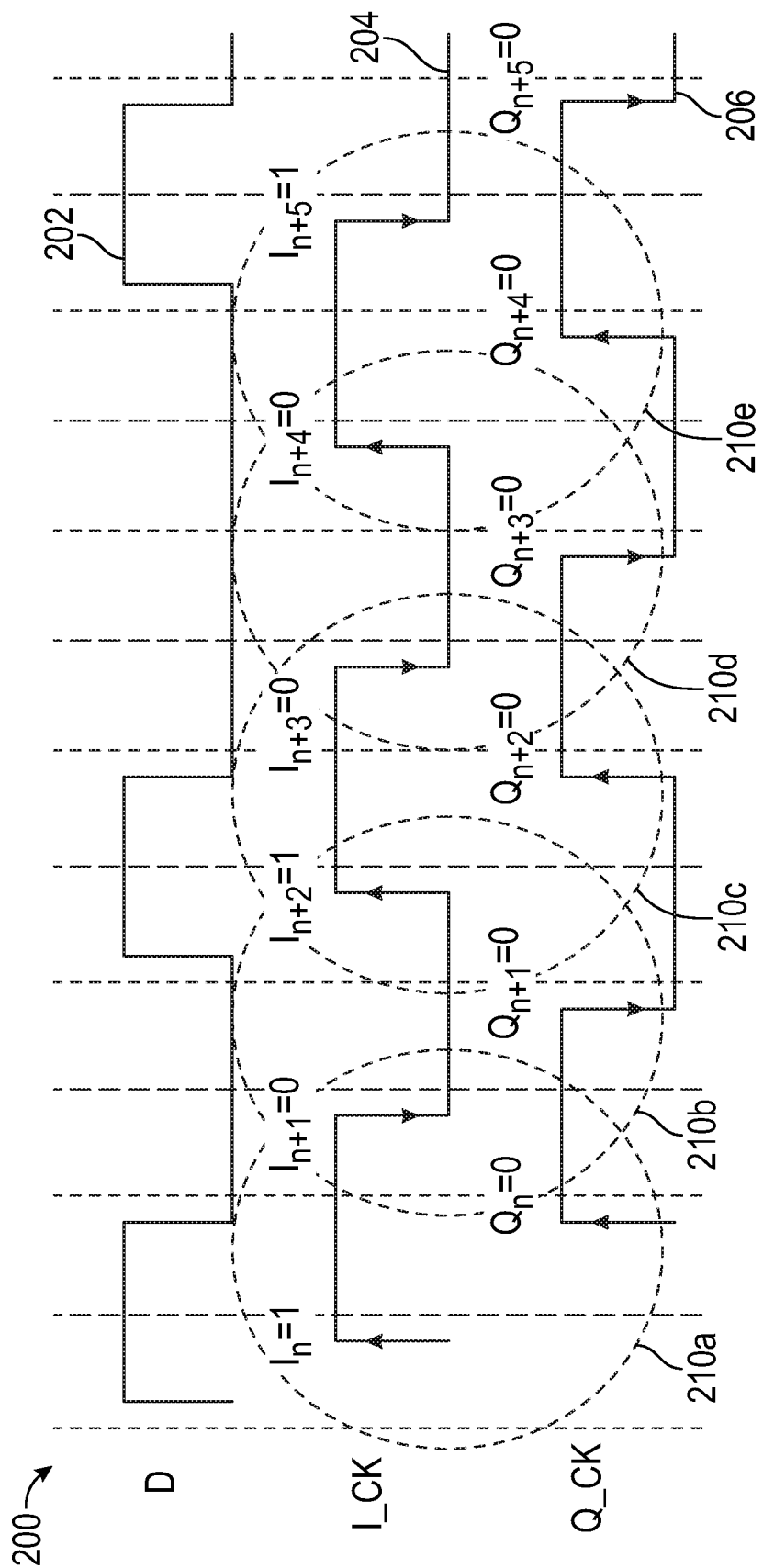

FIG. 2B illustrates the signal diagram 200 for when the clock signal has been adjusted to within 50% of DCD of being locked. For example, the clock is locked when the leading edge of the I signal 204 is within 50% of DCD of the center of the leading pulse of the data stream 202. Now that the clock has been trained, the VREF 108 may also similarly be trained (e.g., through VREF loop convergence). For example, with reference to logic table 300 of FIG. 3A, the first triplet 210a (e.g., $I_n=1$, $Q_n=0$, and $I_{n+1}=0$), the second triplet 210b (e.g., $I_{n+1}=0$, $Q_{n+1}=0$, and $I_{n+2}=1$), the third triplet 210c (e.g., $I_{n+2}=1$, $Q_{n+2}=0$, and $I_{n+3}=0$), and the fifth triplet 210e (e.g., $I_{n+4}=0$, $Q_{n+4}=0$, and $I_{n+5}=1$) indicate that the VREF 108 should be decreased. Although the fourth triplet 210d (e.g., $I_{n+3}=0$, $Q_{n+3}=0$, and $I_{n+4}=0$) indicates that the VREF 108 should not be changed, the average of the triplets 210a-210e indicates overall that the VREF 108 should be decreased. Therefore, the VREF 108 is accordingly decreased.

Figure 2C:
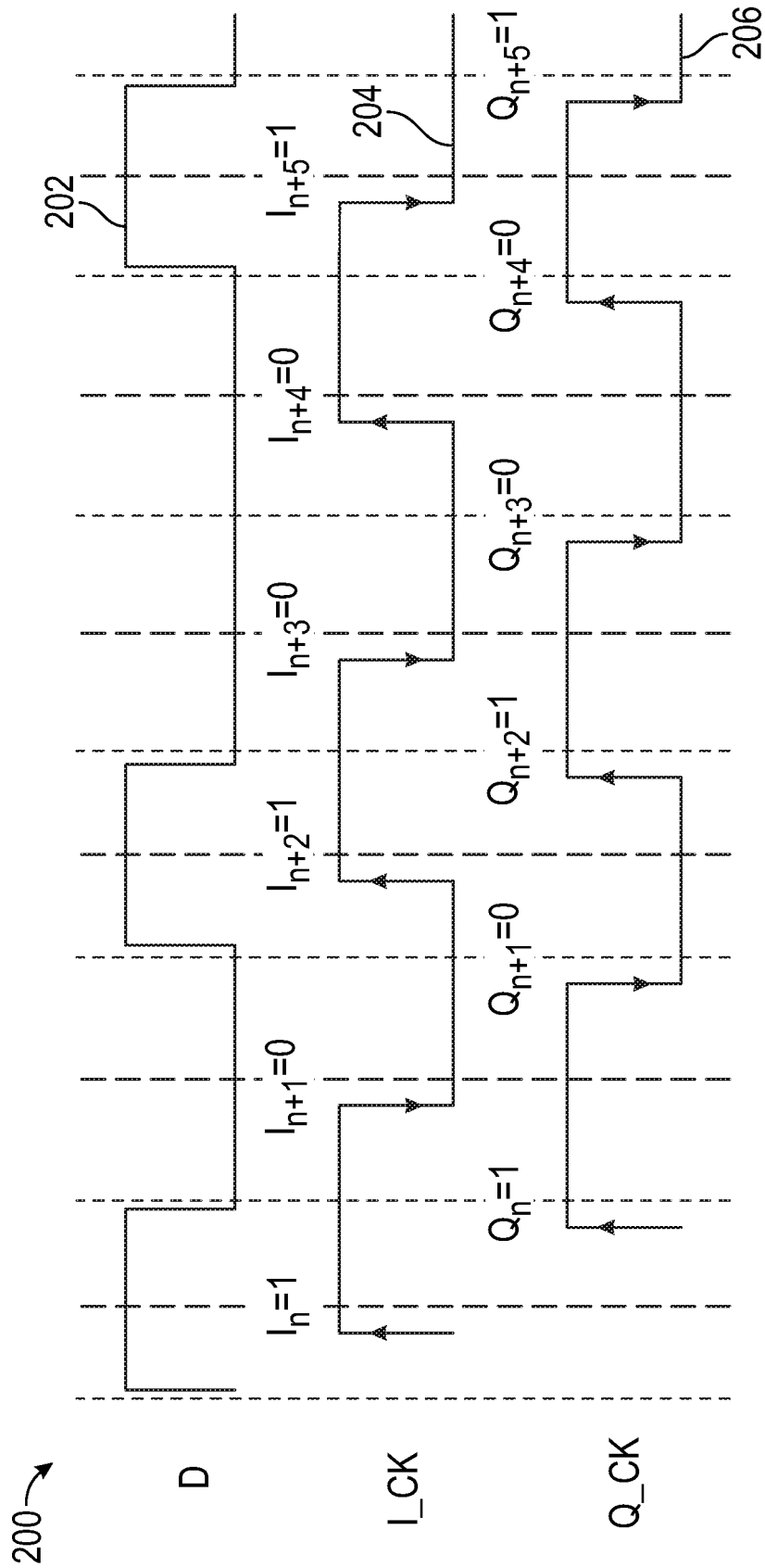

FIG. 2C illustrates the signal diagram 200 for when the VREF 108 has been trained to within a specified tolerance. For example, the VREF 108 may be trained until a width of the pulse of the data stream 202 is about equal to 1UI. This is because after training the VREF 108, the DCD in the data stream 202 is reduced. According to an aspect, the clock signal and the VREF 108 may continue to be trained until the DCD is reduced to zero and the clock signal locks at 0.5UI.

Figure 2D:
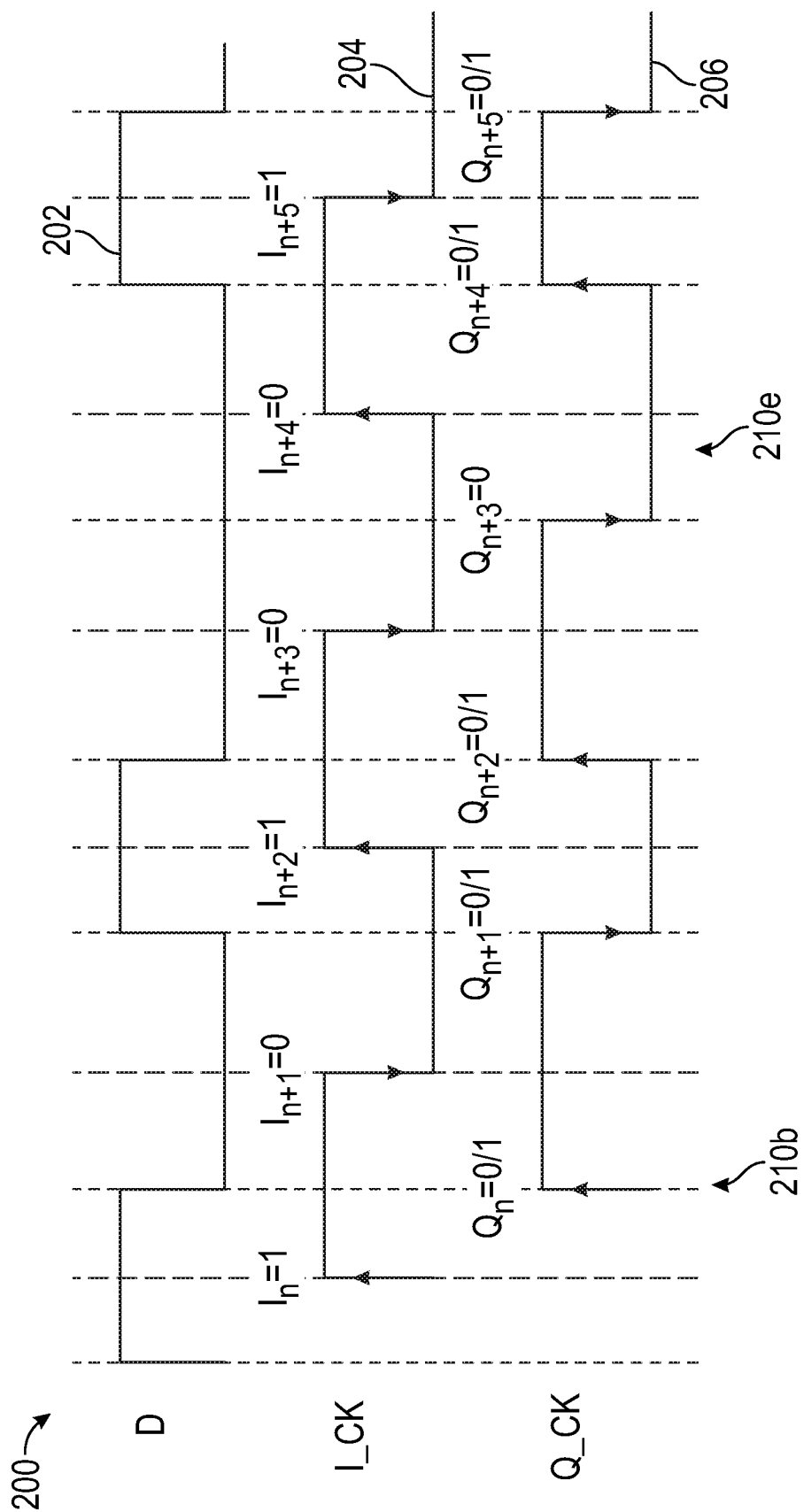

FIG. 2D illustrates the signal diagram 200 for when the DCD has been reduced to zero and the clock signal is locked at 0.5UI. For example, this result may be achieved after multiple iterations of VREF training and CK recovery, as described above in relation to FIGS. 2A-2C. As illustrated in FIG. 2D, $Q_n$, $Q_{n+1}$, $Q_{n+2}$, $Q_{n+4}$, and $Q_{n+5}$ all have reached an equilibrium point of being equally likely to be either a logic "1" or a logic "0." Once the equilibrium point has been reached, the signal training may end and signal training iterations may be considered complete. In an implementation, when either voltage or temperature of the system changes, VREF training and CK recovery loops may activate again to reach a new equilibrium point.

According to an aspect, the clock recovery and VREF training loops may be invoked either alternatively or simultaneously. In an implementation, when invoked simultaneously, the VREF training may be performed on a slower loop than for the clock recovery. According to an aspect, digital low pass filters (LPF) may be utilized in both loops to consider a large number of samples before updating the phase interpolator (PI) code and VREF value.

Figure 2E:
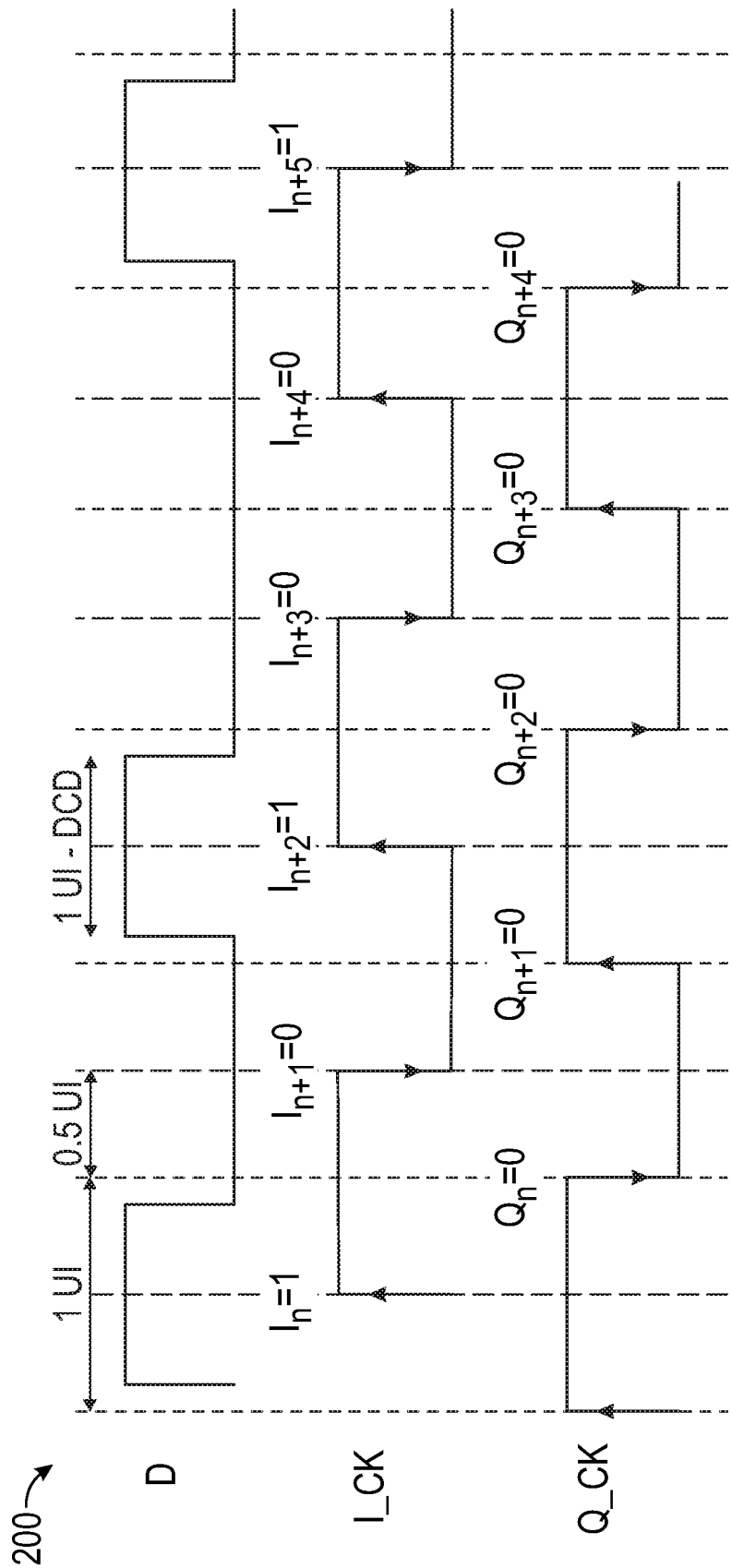

FIG. 2E illustrates the signal diagram 200 for when the clock signal is locked at a center of a data bit, but VREF 108 is high. For example, $I_n=1$, $Q_n=0$, $I_{n+1}=0$ and $I_n=0$, $Q_n=0$, and $I_{n+1}=1$. According to an aspect, VREF 108 would decrease while the clock signal position would stay the same due to an equal number of decrease/increase phase adjustments.

Figure 2F:
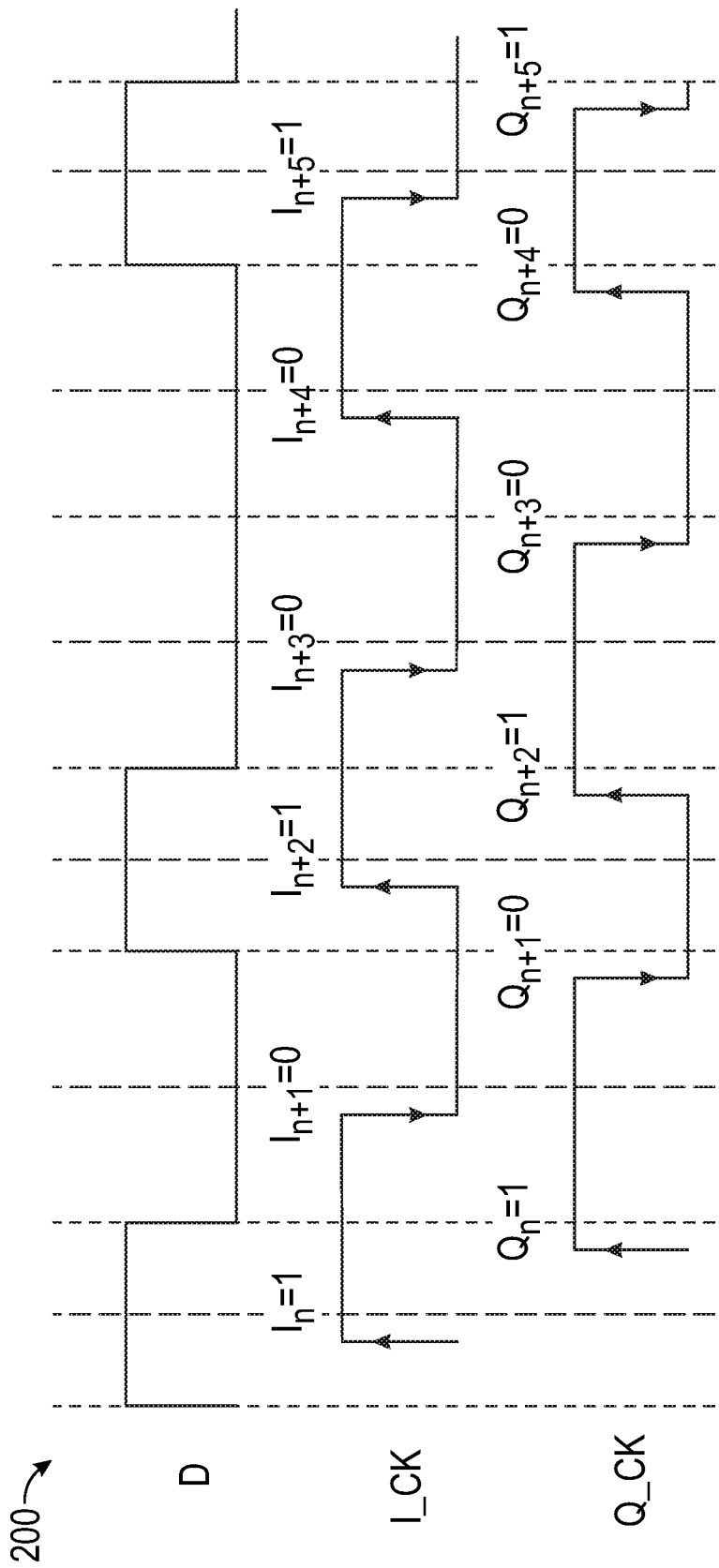

FIG. 2F illustrates the signal diagram 200 for when VREF 108 is equal to a signal common mode, but the clock signal is early. For example, $I_n=1$, $Q_n=1$, $I_{n+1}=0$ and $I_n=0$, $Q_n=0$, $I_{n+1}=1$. According to an aspect, the clock signal phase would increase and VREF 108 would stay the same due to an equal number of decrease/increase VREF adjustments.

FIG. 3A illustrates a VREF maintenance mode logic table 300, according to certain aspects of the disclosure. As discussed above in relation to FIGS. 2A-2D, the logic table 300 may be utilized to determine whether to increase, decrease, or not change both the VREF and the clock phase based on sampled triplets of clock signals.

According to an aspect, the clock recovery options may be based on XOR logic. For example, if $I_n$ XOR $Q_n=0$ and $I_{n+1}$ XOR $Q_n=1$, then it is an indicator that the clock is early. Therefore the clock phase should be increased. Similarly, if $I_n$ XOR $Q_n=1$ and $I_{n+1}$ XOR $Q_n=0$, then it is an indicator that the clock is late, and the clock phase should be decreased.

According to an aspect, VREF training and clock recovery controls are orthogonal, which allows for simultaneous training for both. For example, if the clock is at a center of a data bit and VREF is higher than a signal common mode, then $I_n=1$, $Q_n=0$, $I_{n+1}=0$, and $I_{n+1}=0$, $Q_{n+1}=0$, $I_{n+2}=1$. VREF would decrease for both triplets while the clock position would stay the same due to an equal number of decrease/increase phase adjustments. This is because for the first triplet (e.g., 100), the clock phase is decreased, and for the second triplet (e.g., 001), the clock phase is increased, which cancel each other (e.g., as shown in FIG. 2E).

Similarly, if VREF is equal to signal common mode and the clock is early, then $I_n=1$, $Q_n=1$, $I_{n+1}=0$, and $I_{n+1}=0$, $Q_{n+1}=0$, $I_{n+2}=1$. The clock phase would increase and VREF would stay the same due to an equal number of decrease/increase VREF adjustments. This is because for the first triplet (e.g., 110), VREF is increased, and for the second triplet (e.g., 001), VREF is decreased, which cancel each other (e.g., as shown in FIG. 2F).

In an implementation, single-ended systems like GDDR6 may include input data stream patterns that are random in nature, and so there may be long streams of either 0's or 1's. During long streams of 0's or 1's, VREF and clock recovery do not update. Other schemes (e.g., conventional schemes) may adjust VREF and/or CK phase, which would be incorrect since there is no timing or VREF information in these patterns. The logic table 300 addresses such streams, and allows the system to perform background VREF training during the maintenance mode with live data to minimize timing loss due to VT drift.

FIG. 3B illustrates a VREF initialization mode logic table 350, according to certain aspects of the disclosure. The logic table 350 may be utilized to train VREF and the clock signal at initialization.

According to an aspect, instead of performing an eye-scan and performing a brute force process, VREF training at initialization may be performed by utilizing the logic table 350. For example, similar to the above description for FIGS. 2A-2D, samples of I and Q signals may be utilized to determine whether to increase, decrease, or not change the VREF and the clock phase according to the logic table 350.

As illustrated in FIG. 1B, at initialization, there is a possibility of VREF 108 being either lower than VIL 104 or higher than VIH 102 of the input stream 106 (e.g., the PAD signal). In such a scenario, $I_n$, $Q_n$, and $I_{n+1}$ sample values would all be either "0" or "1." As a result, the logic table 300 may be modified as shown in logic table 350 to accommodate this scenario. In an implementation, logic table 350 may be applicable only during initialization, as in the maintenance mode there is a possibility that the live data may have a long stream of either "0's" or "1's," and this update logic may change VREF slightly in the wrong direction.

According to an aspect, at initialization, the data pattern for training may be chosen to not have a long stream of either "0's" or "1's" (e.g., 1010). In an implementation, valid data transmission may begin after clock recovery and VREF training is complete. Clock recovery and VREF training may occur either simultaneously or alternatively.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 4:
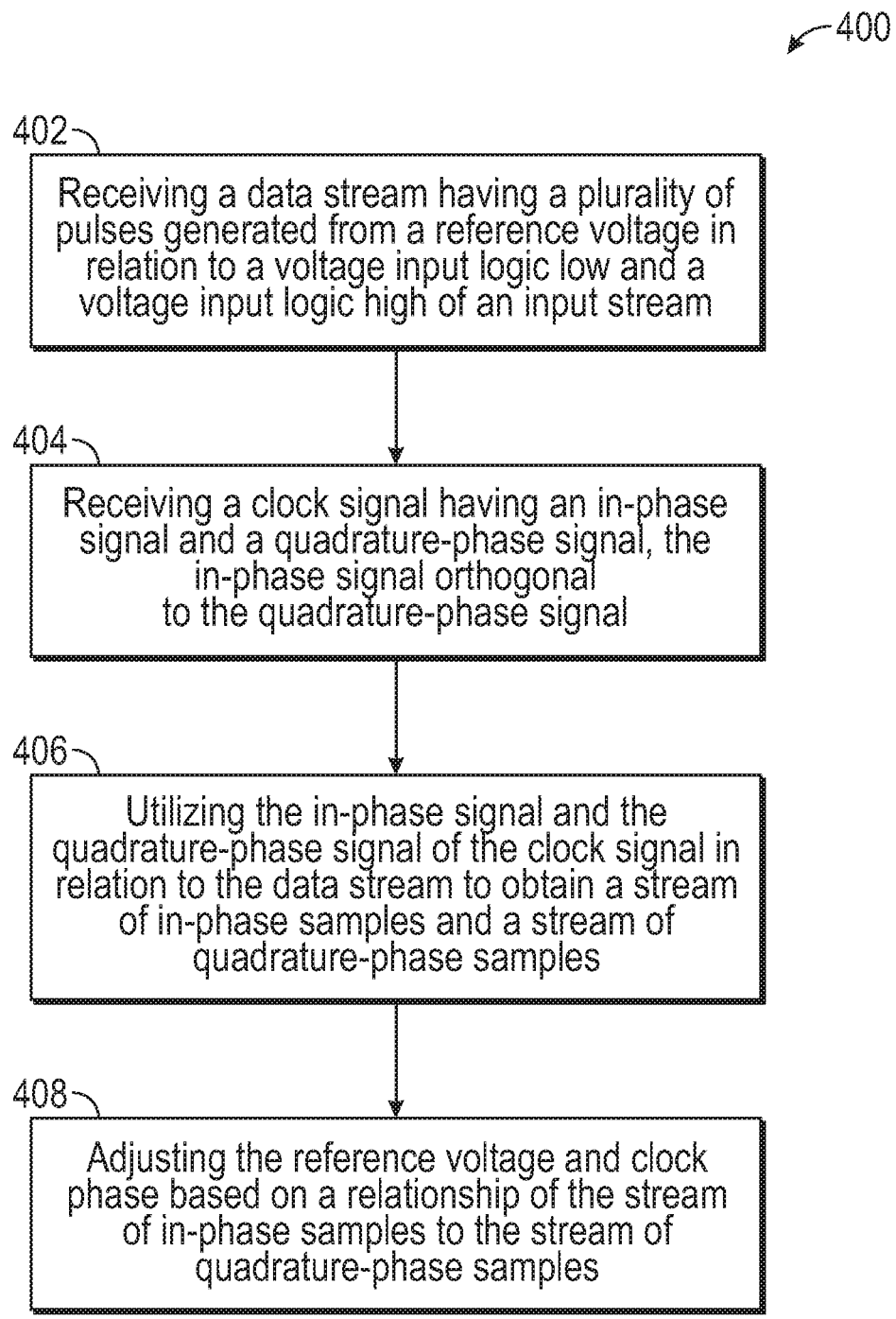
FIG. 4 illustrates an example flow diagram for DDR reference voltage training, according to certain aspects of the disclosure.

FIG. 4 illustrates an example flow diagram (e.g., process 400) for DDR reference voltage training, according to certain aspects of the disclosure. For explanatory purposes, the example process 400 is described herein with reference to FIGS. 1-3. Further, for explanatory purposes, the steps of the example process 400 are described herein as occurring serially or linearly. However, multiple steps of the example process 400 may occur in parallel. In addition, the steps of the example process 400 need not be performed in the order shown and/or one or more of the steps of the example process 400 need not be performed. For purposes of explanation of the subject technology, the process 400 will be discussed in reference to FIGS. 1-3.

At step 402, a data stream is received that includes pulses generated from a reference voltage in relation to a voltage input logic low and a voltage input logic high of an input stream. At step 404, a clock signal is received that includes an in-phase signal and a quadrature-phase signal, the in-phase signal orthogonal to the quadrature-phase signal. At step 406, the in-phase signal and the quadrature-phase signal of the clock signal are used to sample the data stream to obtain a stream of in-phase samples and a stream of quadrature-phase samples. At step 408, the reference voltage and clock phase are adjusted based on a relationship of the stream of in-phase samples to the stream of quadrature-phase samples.

For example, as described above in relation to FIGS. 1-3, at step 402, a data stream 202 is received that includes pulses generated from VREF 108 in relation to VIL 104 and VIH 102 of an input stream 106. At step 404, a clock signal is received that includes an I signal 204 and a Q signal 206. The I signal 204 may be orthogonal to the Q signal 206. At step 406, the I signal 204 and the Q signal 206 of the clock signal are utilized to sample the data stream 202 to obtain a stream of I samples (e.g., $I_n$, $I_{n+1}$, $I_{n+2}$, etc.) and a stream of Q samples (e.g., $Q_n$, $Q_{n+1}$, $Q_{n+2}$, etc.). At step 408, the VREF 108 and the clock phase are adjusted based on a relationship of the stream of I samples to the stream of Q samples. For example, logic tables 300 and 350 may be utilized to determine how to adjust VREF 108 and the clock phase.

According to an aspect, the process 400 further includes adjusting the reference voltage according to a maintenance mode table, the maintenance mode table charting the relationship of the stream of in-phase samples to the stream of quadrature-phase samples for maintenance of the reference voltage.

According to an aspect, the process 400 further includes adjusting the reference voltage according to an initialization mode table, the initialization mode table charting the relationship of the stream of in-phase samples to the stream of quadrature-phase samples during initialization of the reference voltage.

According to an aspect, the process 400 further includes adjusting the reference voltage based on an average of a plurality of sampled triplets, the plurality of sampled triplets comprising two consecutive in-phase samples and one quadrature-phase sample, the quadrature-phase sample taken between the two consecutive in-phase samples.

According to an aspect, the process 400 further includes adjusting the clock signal based on the relationship of the stream of in-phase samples to the stream of quadrature-phase samples.

According to an aspect, the process 400 further includes adjusting the clock signal according to a clock recovery table, the clock recovery table charting the relationship of the stream of in-phase samples to the stream of quadrature-phase samples.

According to an aspect, the process 400 further includes adjusting the clock signal based on an average of a plurality of sampled triplets, the plurality of sampled triplets comprising two consecutive in-phase samples and one quadrature-phase sample, the quadrature-phase sample taken between the two consecutive in-phase samples.

According to an aspect, the process 400 further includes adjusting the clock signal prior to adjusting the reference voltage. The clock signal and the reference voltage may also be adjusted simultaneously. According to an aspect, the process 400 further includes alternatingly adjusting the clock signal and the reference voltage.

Hardware Overview

Figure 5:
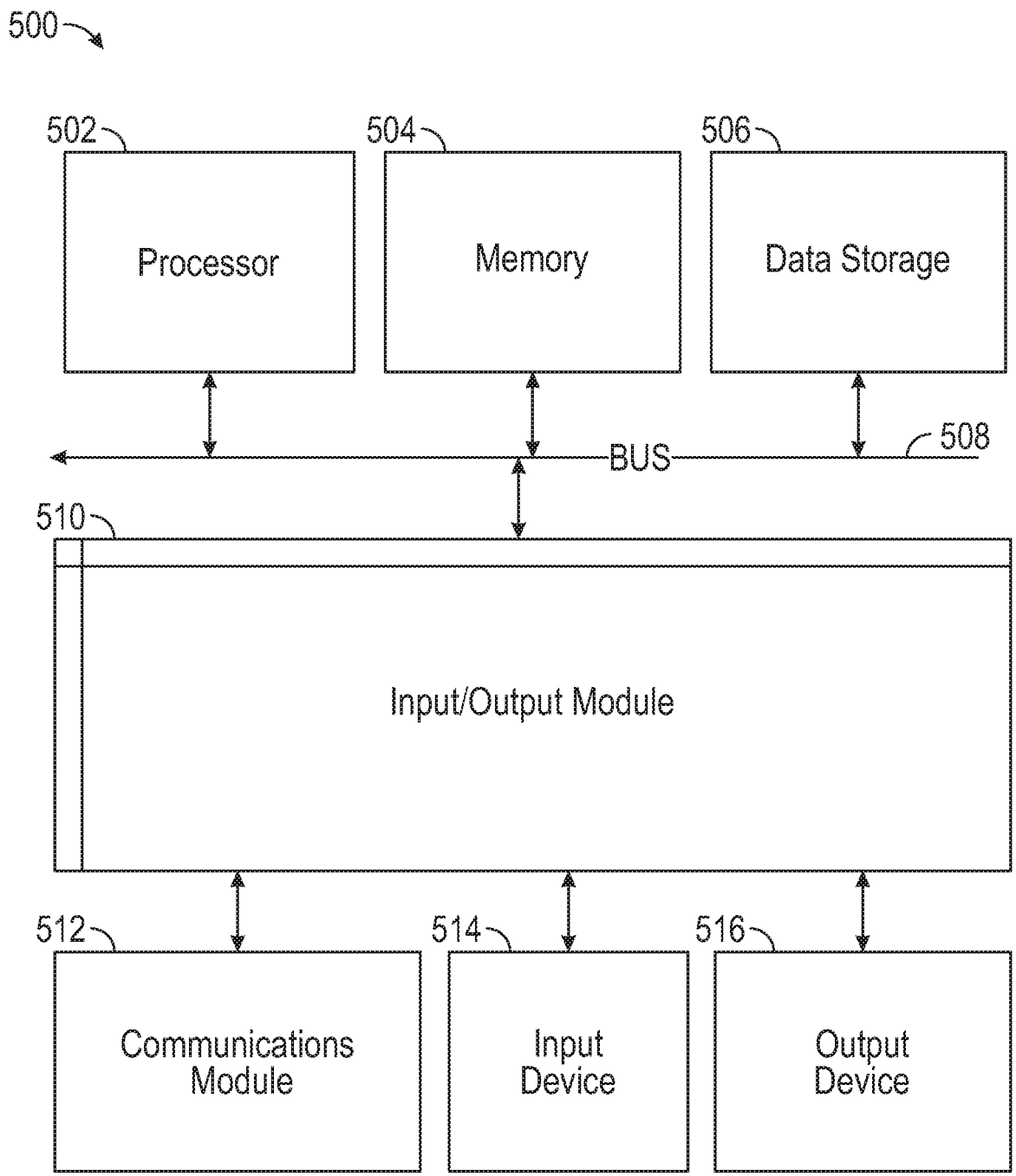
FIG. 5 is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., smartphone, desktop computer, tablet, laptop, etc.) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads data and provides a function, information may be read from the data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for double data rate (DDR) reference voltage training, comprising:
   receiving a data stream, the data stream comprising a plurality of pulses generated using a reference voltage in relation to a voltage input logic low and a voltage input logic high of an input stream;
   receiving a clock signal, the clock signal comprising an in-phase signal and a quadrature-phase signal, the in-phase signal being orthogonal to the quadrature-phase signal;
   utilizing the in-phase signal and the quadrature-phase signal of the clock signal in relation to the data stream to obtain a stream of in-phase samples and a stream of quadrature-phase samples; and
   adjusting the reference voltage based on a relationship of the stream of in-phase samples to the stream of quadrature-phase samples using a first set of logic during an initialization phase or a second set of logic during a maintenance phase, wherein the first set of logic is different from the second set of logic and the data stream comprises a test data pattern during the initialization phase and live data during the maintenance phase.

2. The computer-implemented method of claim 1, wherein the second set of logic is maintained in a maintenance mode table, the maintenance mode table charting a relationship of the stream of in-phase samples to the stream of quadrature-phase samples for maintenance of the reference voltage.

3. The computer-implemented method of claim 1, wherein the first set of logic is maintained in an initialization mode table, the initialization mode table charting a relationship of the stream of in-phase samples to the stream of quadrature-phase samples during initialization of the reference voltage.

4. The computer-implemented method of claim 1, wherein the reference voltage is adjusted based on an average of a plurality of sampled triplets, the plurality of sampled triplets comprising two consecutive in-phase samples and one quadrature-phase sample, the quadrature-phase sample taken between the two consecutive in-phase samples.

5. The computer-implemented method of claim 1, further comprising:
adjusting the clock signal based on a corresponding relationship of the stream of in-phase samples to the stream of quadrature-phase samples using the first set of logic during the initialization phase or the second set of logic during the maintenance phase.

6. The computer-implemented method of claim 5, further comprising:
adjusting the clock signal based on an average of a plurality of sampled triplets, the plurality of sampled triplets comprising two consecutive in-phase samples and one quadrature-phase sample, the quadrature-phase sample taken between the two consecutive in-phase samples.

7. The computer-implemented method of claim 5, wherein the clock signal is adjusted prior to adjusting the reference voltage.

8. The computer-implemented method of claim 5, wherein the clock signal and the reference voltage are adjusted based on the corresponding relationships of the stream of in-phase samples to the stream of quadrature-phase samples.

9. A system for double data rate (DDR) reference voltage training, comprising:
a processor; and
a memory comprising instructions stored thereon, which when executed by the processor, causes a set of acts comprising:
receiving a data stream, the data stream comprising a plurality of pulses generated using a reference voltage in relation to a voltage input logic low and a voltage input logic high of an input stream;
receiving a clock signal, the clock signal comprising an in-phase signal and a quadrature-phase signal, the in-phase signal being orthogonal to the quadrature-phase signal;
utilizing the in-phase signal and the quadrature-phase signal of the clock signal in relation to the data stream to obtain a stream of in-phase samples and a stream of quadrature-phase samples; and
adjusting the reference voltage based on a relationship of the stream of in-phase samples to the stream of quadrature-phase samples using a first set of logic during an initialization phase or a second set of logic during a maintenance phase, wherein the first set of logic is different from the second set of logic and the data stream comprises a test data pattern during the initialization phase and live data during the maintenance phase.

10. The system of claim 9, wherein the second set of logic is maintained in a maintenance mode table, the maintenance mode table charting a relationship of the stream of in-phase samples to the stream of quadrature-phase samples for maintenance of the reference voltage.

11. The system of claim 9, wherein the first set of logic is maintained in an initialization mode table, the initialization mode table charting a relationship of the stream of in-phase samples to the stream of quadrature-phase samples during initialization of the reference voltage.

12. The system of claim 9, wherein the reference voltage is adjusted based on an average of a plurality of sampled triplets, the plurality of sampled triplets comprising two consecutive in-phase samples and one quadrature-phase sample, the quadrature-phase sample taken between the two consecutive in-phase samples.

13. The system of claim 9, wherein the set of acts further comprise adjusting the clock signal based on a corresponding relationship of the stream of in-phase samples to the stream of quadrature-phase samples using the first set of logic during the initialization phase or the second set of logic during the maintenance phase.

14. The system of claim 13, wherein the clock signal is adjusted prior to adjusting the reference voltage.

15. The system of claim 13, wherein the set of acts further comprise adjusting the clock signal based on an average of a plurality of sampled triplets, the plurality of sampled triplets comprising two consecutive in-phase samples and one quadrature-phase sample, the quadrature-phase sample taken between the two consecutive in-phase samples.

16. The system of claim 13, wherein the clock signal and the reference voltage are adjusted based on the corresponding relationships of the stream of in-phase samples to the stream of quadrature-phase samples.

17. A non-transitory computer readable medium having stored thereon a set of instructions which, when executed by a processor, cause a set of acts for double data rate (DDR) reference voltage training, the set of acts comprising:
receiving a data stream, the data stream comprising a plurality of pulses generated using a reference voltage in relation to a voltage input logic low and a voltage input logic high of an input stream;
receiving a clock signal, the clock signal comprising an in-phase signal and a quadrature-phase signal, the in-phase signal being orthogonal to the quadrature-phase signal;
utilizing the in-phase signal and the quadrature-phase signal of the clock signal in relation to the data stream to obtain a stream of in-phase samples and a stream of quadrature-phase samples; and
adjusting the reference voltage based on a relationship of the stream of in-phase samples to the stream of quadrature-phase samples using a first set of logic during an initialization phase or a second set of logic during a maintenance phase, wherein the first set of logic is different from the second set of logic and the data stream comprises a test data pattern during the initialization phase and live data during the maintenance phase.

18. The non-transitory computer readable medium of claim 17, wherein the second set of logic is maintained in a maintenance mode table, the maintenance mode table charting a relationship of the stream of in-phase samples to the stream of quadrature-phase samples for maintenance of the reference voltage.

19. The non-transitory computer readable medium of claim 17, wherein the first set of logic is maintained in an initialization mode table, the initialization mode table charting a relationship of the stream of in-phase samples to the stream of quadrature-phase samples during initialization of the reference voltage.

20. The non-transitory computer readable medium of claim 17, wherein the set of acts further comprise adjusting the clock signal based on a corresponding relationship of the stream of in-phase samples to the stream of quadrature-phase samples using the first set of logic during the initialization phase or the second set of logic during the maintenance phase.

\* \* \* \* \*